United States Patent
Cheng et al.

(10) Patent No.: US 12,190,245 B2
(45) Date of Patent: Jan. 7, 2025

(54) MULTI-TASK SEGMENTED LEARNING MODELS

(71) Applicant: Alibaba Group Holding Limited, Grand Cayman (KY)

(72) Inventors: Chao Cheng, Santa Clara, CA (US); Xiaoxin Fan, Sunnyvale, CA (US); Minghai Qin, Sunnyvale, CA (US); Yuan Xie, Goleta, CA (US)

(73) Assignee: Alibaba Group Holding Limited, Grand Cayman (KY)

( * ) Notice: Subject to any disclaimer, the term of this patent is extended or adjusted under 35 U.S.C. 154(b) by 692 days.

(21) Appl. No.: 16/680,195

(22) Filed: Nov. 11, 2019

(65) Prior Publication Data
US 2021/0142210 A1 May 13, 2021

(51) Int. Cl.
*G06N 3/084* (2023.01)
*G06F 17/16* (2006.01)
(Continued)

(52) U.S. Cl.
CPC .............. *G06N 3/084* (2013.01); *G06F 17/16* (2013.01); *G06F 18/214* (2023.01); *G06N 20/00* (2019.01);
(Continued)

(58) Field of Classification Search
CPC .... G06N 20/00; A61N 5/1031; G06F 18/2413
(Continued)

(56) References Cited

U.S. PATENT DOCUMENTS

2013/0195361 A1 8/2013 Deng et al.
2014/0164299 A1 6/2014 Sainath et al.
(Continued)

FOREIGN PATENT DOCUMENTS

CA 3055597 A1 * 9/2018 ......... G06F 18/2413
CN 113298127 A * 8/2021
(Continued)

OTHER PUBLICATIONS

The International Preliminary Report on Patentability for PCT Application No. PCT/US20/56132, mailed May 27, 2022, 7 pages.
(Continued)

*Primary Examiner* — Ruay Ho
(74) *Attorney, Agent, or Firm* — Lee & Hayes, P.C.

(57) ABSTRACT

Methods and systems are provided for implementing training of learning models, including obtaining a pre-trained weight set for a learning model on a sample dataset and on a first loss function; selecting at least two tasks having heterogeneous features to be computed by a reference model; obtaining a reference dataset for the at least two tasks; designating a second loss function for feature embedding between the heterogeneous features of the at least two tasks; training the learning model on the first loss function and training the reference model on the second loss function, in turn; and updating the weight set based on a feature embedding learned by the learning model and a feature embedding learned by the reference model, in turn. Methods and systems of the present disclosure may alleviate computational overhead incurred by executing the learning model and loading different weight sets at a central network of the model.

20 Claims, 6 Drawing Sheets

(51) Int. Cl.
  *G06F 18/214* (2023.01)
  *G06N 20/00* (2019.01)
  *G06V 10/764* (2022.01)
  *G06V 10/82* (2022.01)
  *G06V 10/94* (2022.01)
  *G06V 40/30* (2022.01)

(52) U.S. Cl.
  CPC ............ *G06V 10/764* (2022.01); *G06V 10/82* (2022.01); *G06V 10/955* (2022.01); *G06V 40/394* (2022.01)

(58) Field of Classification Search
  USPC ....................................................... 706/12, 20
  See application file for complete search history.

(56) References Cited

U.S. PATENT DOCUMENTS

| | | | | |
|---|---|---|---|---|
| 2014/0358831 | A1* | 12/2014 | Adams | G06N 7/005 706/20 |
| 2017/0011730 | A1 | 1/2017 | Seto et al. | |
| 2017/0132528 | A1* | 5/2017 | Aslan | G06N 20/00 |
| 2018/0211099 | A1 | 7/2018 | Ranjan et al. | |
| 2018/0336509 | A1* | 11/2018 | Guttmann | G06N 20/00 |
| 2018/0349158 | A1* | 12/2018 | Swersky | G06N 3/0472 |
| 2019/0130275 | A1* | 5/2019 | Chen | G06N 3/0454 |
| 2019/0378037 | A1* | 12/2019 | Kale | G06F 17/11 |
| 2020/0082248 | A1* | 3/2020 | Villegas | G06N 3/044 |
| 2020/0133735 | A1* | 4/2020 | Zhao | G06F 9/5083 |
| 2020/0265196 | A1* | 8/2020 | Ravi | G06N 3/044 |

FOREIGN PATENT DOCUMENTS

| | | | | |
|---|---|---|---|---|
| WO | WO2018015080 | A1 | | 1/2018 |
| WO | WO-2019027924 | A1 * | 2/2019 | ........... A61N 5/1031 |

OTHER PUBLICATIONS

The PCT Search Report and Written Opinion mailed Jan. 27, 2021 for PCT application No. PCT/US20/56132, 8 pages.
Pouyanfar, et. al., "Automatic Video Event Detection for Imbalance Data Using Enhanced Ensemble Deep Learning", International Journal of Semantic Computing, Mar. 27, 2017, 22 pages, Retrieved from URL <<https://users.cs.fiu.edu/-chens/PDF/IJSC_2017_Samira.pdf>>.

* cited by examiner

MULTI-TASK SEGMENTED LEARNING MODELS

BACKGROUND

In machine learning and particularly deep learning, a major cost in terms of computational resources and overhead is pre-training a learning model to learn features to be recognized. Broadly, a learning model may have a defined model architecture as a component, such as, for example, a convolutional neural network (CNN), a recurrent neural network (RNN), and the like. In order to be capable of receiving input content, such as images, videos, text, spoken audio, and the like, and output relevant results, such as classifications, recognized content, matched content, annotations, text-to-speech, speech-to-text, and the like, these models need to be pre-trained to obtain a set of weights to be applied to particular features of input content.

Conventionally, computing using deep learning requires a computing system to load both a learning model and a pre-trained weight set into memory from storage in order to perform computations wherein the model receives input and outputs results. The model and the weight set may be trained on a particular task, taking particular features of inputs and weighing particular features by a particular algorithm, based on an objective function whose output the model is trained to optimize. Consequently, each learning model and a corresponding weight set may be a specialized tool with significant overhead to be deployed, over any other models and weight sets.

Modern Internet of Things (IoT) services, vehicle-to-infrastructure (V2I) services, and other such cloud computing services relying upon deep learning computation provide a cloud computing system connected to many end devices for collecting and processing data. Deep learning cloud services are often provided by computing complex data in multiple formats received from end devices. Whereas cloud computing systems may be high in processing power, including examples such as distributed computing frameworks deployed on servers of a data center, which may include powerful microprocessors such as Neural Processing Units (NPUs), servers and other network nodes at edges of the computing system are generally low-power in specification. These edge nodes may have limited processing power and local storage and memory. Likewise, end devices themselves may be similarly low-power in specification. Moreover, deep learning computation may be deployed at computing systems which are inherently low-powered.

It is desirable to provide deep learning computation in real-time with minimal latency between data collection and output of results, due to, for example, the time-critical nature of applications such as security monitoring and V2I communication. Due to the disparity in processing power and resources between cloud computing systems and edge devices, methods are needed to overcome the overhead and latency shortcomings despite these disparities.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

DETAILED DESCRIPTION

Systems and methods discussed herein are directed to implementing training for learning models, and more specifically pre-training a weight set on feature embeddings of features extracted from tasks supporting performance of heterogeneous functions.

A learning model, according to example embodiments of the present disclosure, may be a defined computation algorithm executable by one or more processors of a computing system to perform tasks that include processing input having various parameters and outputting results. A learning model may be, for example, a layered model such as a deep neural network, which may have a fully-connected structure, may have a feedforward structure such as a convolutional neural network (CNN), may have a backpropagation structure such as a recurrent neural network (RNN), or may have other architectures suited to the computation of particular tasks. Tasks may include, for example, classification, clustering, matching, regression, and the like.

Tasks may provide output for the performance of functions such as recognizing entities in images and/or video; tracking movement of entities in video in real-time; matching recognized entities in images and/or video to other images and/or video; recognizing audio such as spoken words or noises; providing annotations or transcriptions of images, video, and/or audio in real-time; and the like.

Cloud computing systems may provide collections of servers hosting computing resources to provide distributed computing, parallel computing, improved availability of physical or virtual computing resources, and such benefits. Cloud computing systems may host learning models to provide these benefits for the application of computing using learning models. Nevertheless, to alleviate computational overhead in executing learning models on a cloud computing system, learning models may be pre-trained to provide ready-made parameters and weights which may be stored on storage of the cloud computing system and, upon execution, loaded into memory of the cloud computing system. For example, with regard to tasks relating to the function of image recognition, commonly available pre-trained image classifier learning models include ResNet, VGGNet, Inception, Xception and the like.

A cloud computing system may connect to various end devices which collect data to be input into learning models to train the learning models and/or in association with various tasks for the computation and output of results required for the performance of those tasks. End devices may connect to the cloud computing system through edge nodes of the cloud computing system. An edge node may be any server providing an outbound connection from connections to other nodes of the cloud computing system, and thus may demarcate a logical edge, and not necessarily a physical edge, of a network of the cloud computing system. Moreover, an edge node may be edge-based logical nodes that deploy non-centralized computing resources the cloud computing system, such as cloudlets, fog nodes, and the like.

End devices may be responsible for multiple types of task involving multiple types of input data. For example, an end device may be a security camera which collects still images, video, audio, and other types of data, connects to an edge node of a cloud computing system which performs real-time security monitoring of locations being surveilled by such security cameras, and sends each of these types of data in real-time to the cloud computing system to perform various tasks related to real-time security monitoring. Alternatively, an end device may be a smart vehicle in motion which collects still images, video, audio, and other types of data during motion, connects to roadside networking infrastructure which serves as an edge node of a cloud computing system which performs real-time traffic monitoring of smart vehicles, and sends each of these types of data in real-time to the cloud computing system to perform various tasks related to real-time traffic monitoring.

These different types of input may each require computing by learning models and/or weight sets, necessitating a different model or a different weight set to be loaded into memory from storage for each different task. Due to the very large file sizes of weight sets used in deep learning, loading of different models and weight sets may incur substantial computational overhead even before performing computation by a loaded model.

According to some example embodiments of the present disclosure, edge devices (which may refer to any or all of edge nodes and end devices as described above) may have comparatively limited local storage and memory, as well as limited data bus throughput, and thus cannot readily load models and/or weight sets and swap between them.

In an IoT network connected to a cloud computing system, massive numbers of tasks and collections of data associated therewith may be delivered from edge devices to the cloud computing system for processing. Edge devices of the IoT network may be geographically remote from the computational resources of the cloud computing system, resulting in network latency in the transportation of tasks and associated data. The relatively lower computing resource specifications of edge devices compared to the cloud computing system, including processing power, storage, and memory, also results in a relative disparity in computational capacity therebetween. Various architectural designs may be implemented over the learning model in order to address network latency and disparity in computational capacity so as to improve response time and efficiency in completing tasks.

For example, massive quantities of locally collected data at edge devices may result in intolerable degrees of latency if delivered to a cloud computing system for computing by a learning model executing on the cloud computing system. Consequently, it may be desirable to offload some computation by the learning model to localized computation at edge devices, by architectural considerations such as the following.

A learning model may be segmented into modules, sub-models, sub-networks, or otherwise subdivisions thereof (referred to as "sub-networks" henceforth) which may perform computation to provide outputs apart from a central network of the learning model. A central network of the learning model may be referred to by various terms, such as a "backbone," and may be stored and executed on a cloud computing system. Sub-networks may be defined such that the outputs of sub-networks may be input into the backbone, causing the backbone to compute a further output. The outputs of the sub-networks may therefore be referred to as intermediate data. A sub-network may be stored and executed on an edge device using local data as input, outputting intermediate data which is then forwarded to the central network of the learning model, which receives the intermediate data as input and outputs results. The sub-networks may be segmented to be computable within the relatively lower computing resources available at an edge device compared to the cloud computing system, and such that intermediate data output by the sub-networks may be transported to the cloud computing system, such that latency resulting from the computation and network transport does not exceed tolerable levels in accordance with the real-time performance of the tasks being computed by the learning model.

For example, in the event that the task is real-time security monitoring, computational and network latency should be such that computed results from the learning model are output in time to be responsive to events being captured in the video surveillance as they occur. In the event that the task is real-time traffic monitoring of vehicles, computational and network latency should be such that computed results from the learning model are output in time to be responsive to the traffic conditions reflected by the collected data, before those traffic conditions advance significantly.

Even after some computing has been offloaded to edge devices of the cloud computing system in this manner, further computing occurs after intermediate data is delivered to the cloud computing system, and this further computing is likely to incur more computational overload than the offloaded computing at edge devices. Thus, it is desirable to alleviate other types of computational overhead that may occur centrally at the cloud computing system.

For example, the loading of pre-trained learning models, including pre-trained parameters and weights, into memory of the cloud computing system to perform computation may incur computational overhead. Central networks of learning models are designed to provide a common "backbone" for computations relating to different tasks, to prevent computational complexity from increasing linearly with the number of tasks requiring computation. Nevertheless, even if a central network of a single learning model may be loaded centrally at the cloud computing network to compute inputs for multiple tasks, the heterogeneity of tasks (such as classification, clustering, matching, regression, and the like), and thus the heterogeneity of different inputs for different tasks (such as images, videos, text, spoken audio, and the like), there is also heterogeneity in features of different inputs for different tasks, necessitating the loading of different weight sets into the same central network of the learning model.

For example, a central network of a learning model may be trained to compute inputs for a task taking images as input, such tasks providing output for functions including image classification or computer vision. With regard to image input, features which are heterogeneous from features of non-image input (except, in some cases, video input) (herein referred to as "image feature(s)") may include, for example, edge features, corner features, and blob features as known to persons skilled in the art.

For example, a central network of a learning model may be trained to compute inputs for a task taking facial images as input, such tasks providing output for functions including facial recognition or facial matching. With regard to facial image input, features which are heterogeneous from features of non-facial image input (except, in some cases, facial video input) (herein referred to as "facial image feature(s)") may include, for example, eye features, nose features, and mouth features as known to persons skilled in the art.

For example, a central network of a learning model may be trained to compute inputs for a task taking video as input, such as tasks providing output for functions such as video tracking or video annotation. With regard to video input, features which are heterogeneous from features of non-video input (herein referred to as "video feature(s)") may include, for example, motion features as known to persons skilled in the art.

For example, a central network of a learning model may be trained to compute inputs for a task taking audio as input, such as tasks providing output for functions such as audio recognition, source separation or audio annotation. With regard to audio input, features which are heterogeneous from features of non-audio input (herein referred to as "audio feature(s)") may include, for example, zero crossing rate features, energy features, spectral shape features such as spectral centroid features, spectral spread features, and the like, and such features as known to persons skilled in the art.

For example, a central network of a learning model may be trained to compute functions for a task taking text as input, such as tasks providing output for functions such as an image search function. With regard to text input, features which are heterogeneous from features of non-text input (herein referred to as "text feature(s)") may include, for example, word count features, word vectors, and such features as known to persons skilled in the art.

Figure 1:
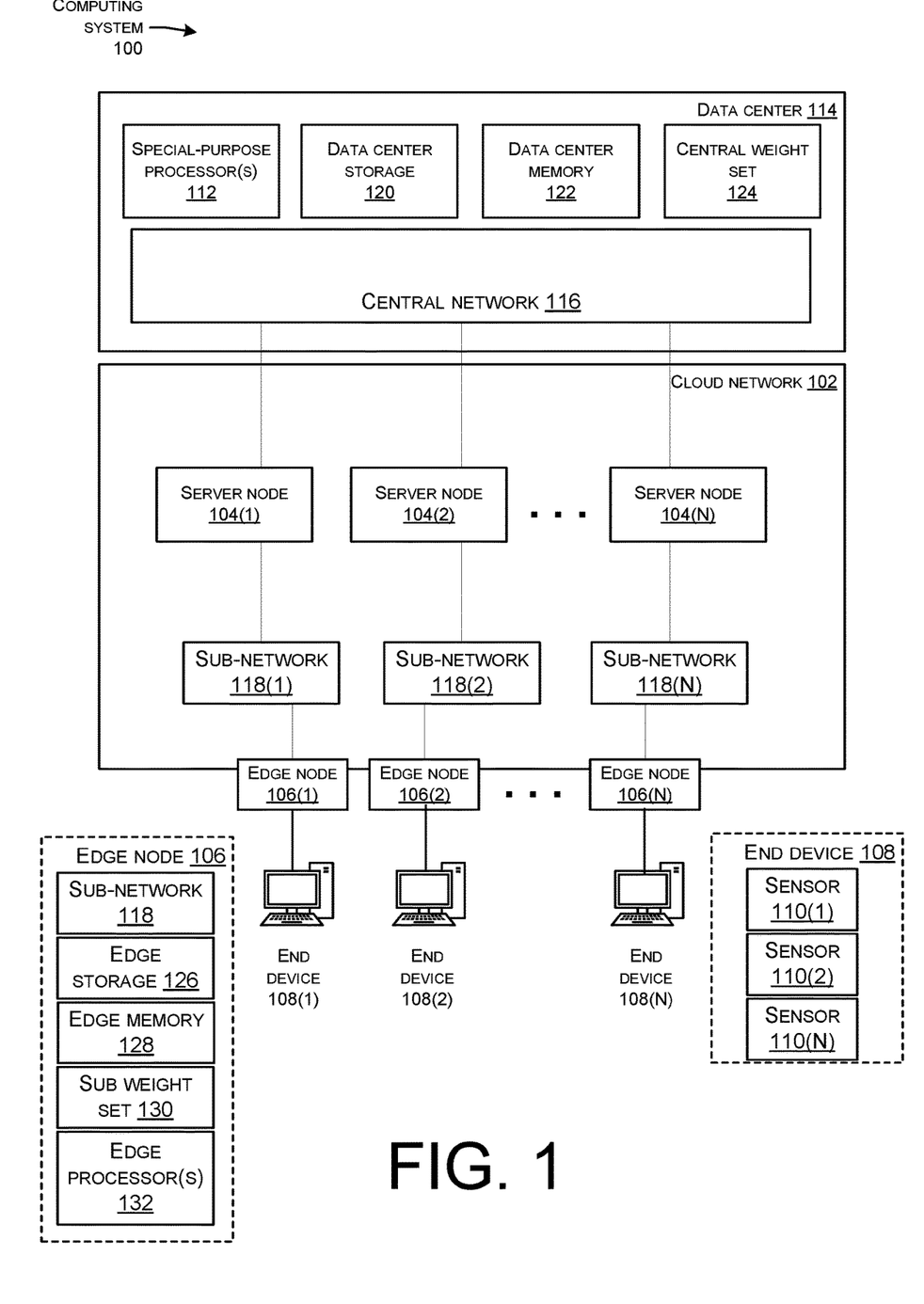
FIG. 1 illustrates an architectural diagram of a cloud computing system according to example embodiments of the present disclosure.

FIG. 1 illustrates an architectural diagram of a computing system 100 according to example embodiments of the present disclosure. The computing system 100 may be implemented over a cloud network 102 of physical or virtual server nodes 104(1), 104(2), . . . , 104(N) (where any unspecified server node may be referred to as a server node 104) connected by physical or virtual network connections. Furthermore, the network 102 terminates at physical or virtual edge nodes 106(1), 106(2), . . . , 106(N) (where any unspecified edge node may be referred to as an edge node 106) located at physical and/or logical edges of the cloud network 102. The edge nodes 106(1) to 106(N) may connect to any number of end devices 108(1), 108(2), . . . , 108(N) (where any unspecified end device may be referred to as an end device 108). An end device 108, such as, by way of example, end device 108(1), may collect heterogeneous data from any number of sensors 110(1), 110(2), . . . , 110(N) (where any unspecified sensor 110 may be referred to as a sensor 110), at least some of the different sensors being operative to collect heterogeneous types of data (such as images, videos, text, spoken audio, and the like).

A pre-trained learning model may be implemented on special-purpose processor(s) 112, which may be hosted at a data center 114. The data center 114 may be part of the cloud network 102 or in communication with the cloud network 102 by network connections. Special-purpose processor(s) 112 may be computing devices having hardware or software elements facilitating computation of neural network computing tasks such as training and inference computations. For example, special-purpose processor(s) 112 may be accelerator(s), such as Neural Network Processing Units ("NPUs"), Graphics Processing Units ("GPUs"), Tensor Processing Units ("TPU"), implementations using field programmable gate arrays ("FPGAs") and application specific integrated circuits ("ASICs"), and/or the like. To facilitate computation of tasks such as training and inference, special-purpose processor(s) 112 may, for example, implement engines operative to compute mathematical operations such as matrix operations and vector operations.

A learning model may include a central network 116 and multiple sub-networks 118(1), 118(2), . . . , 118(N) (where any unspecified sub-network may be referred to as a sub-network 118). The central network 116 may be stored on physical or virtual storage 120 of the data center 114 ("data center storage"), and may be loaded into physical or virtual memory 122 of the data center 114 ("data center memory") (which may be dedicated memory of the special-purpose processor(s) 112) alongside a pre-trained central weight set 124 in order for the special-purpose processor(s) 112 to execute the central network 116 of the learning model to compute input related to one or more tasks.

The sub-networks 118 may be stored on physical or virtual edge storage 126 of any number of the edge nodes 106 or end devices 108 ("edge storage"), and may be loaded into physical or virtual edge memory 128 of any number of the edge nodes 106 or end devices 108 ("edge memory") alongside a pre-trained sub weight set 130 in order for one or more physical or virtual edge processor(s) 132 of the edge node 106 or end device 108 ("edge processor(s)") to execute a sub-network 118 of the learning model to compute input related to one or more tasks. For the purpose of the present disclosure, any of edge nodes 106 or end devices 108 may be referred to as "edge devices" for brevity.

Execution of a sub-network 118 at an edge device may cause the edge device to load the sub-network 118 into physical or virtual edge memory 128 and compute input data collected from sensors 110 of an end device 108. The input may be collected by end devices 108 for the computation of particular tasks supporting the performance of heterogeneous functions selected by the end devices 108. The decision of which functions to be performed by the end devices 108 may be arbitrarily designated by operation of the end devices 108, by end users, by third parties, or by other means.

The input may be obtained directly from the edge device if the edge device is an end device 108, or may be delivered to the edge device over a network connection from an end device 108 if the edge device is an edge node 106. The sub-network 118 may output intermediate data and deliver this intermediate data to the central network 116 over the cloud network 102.

The cloud network 102 may host network-accessed frontends and/or interfaces which allow edge devices to access the central network 102 hosted at the data center 114 and access computing resources of the data center 114, such as the special-purpose processor(s) 112, to perform further computation of the intermediate data.

Execution of the central network 116 may then cause the special-purpose processor(s) 112 to load the central network 116 into physical or virtual memory 122 and compute intermediate data collected from sub-networks 118. The central network 116 may output results required for the performance of heterogeneous functions selected by the end devices 108, and may return the results to the end devices 108.

Furthermore, according to other example embodiments of the present disclosure, the cloud computing system or another system utilized to execute the learning model to compute inputs may be comparatively low-powered. For example, the computing system may not be a cloud computing system but a single physical computer or physical server.

Therefore, whether computational latency results from loading of learning models, loading of weight sets, network latency, or complex computations performed by executing a deep learning model, each type of latency may result from the heterogeneity of tasks, inputs, and features due to the need for learning models of the system to support performance of heterogeneous functions (such as recognizing entities in images and/or video; tracking movement of entities in video in real-time; matching recognized entities in images and/or video to other images and/or video; recognizing audio such as spoken words or noises; providing annotations or transcriptions of images, video, and/or audio in real-time; and the like). It is therefore desirable to improve learning models so as to reduce computational overhead incurred due to this heterogeneity of functions, features, inputs, and tasks.

Example embodiments of the present disclosure provide methods for pre-training a learning model to produce at least one weight set interoperable with computation of input features for multiple tasks supporting the performance of heterogeneous functions.

Figure 2:
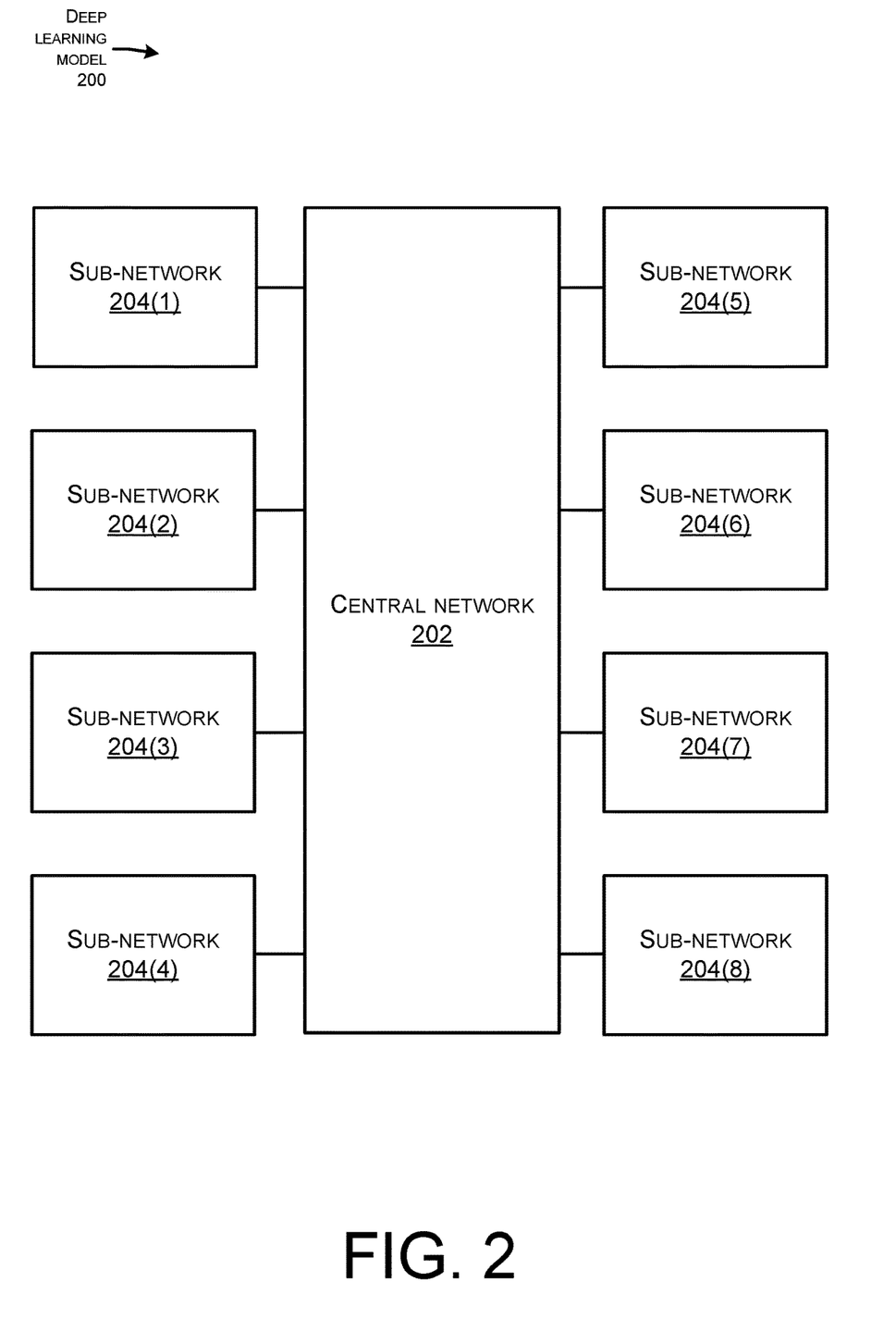
FIG. 2 illustrates a diagram of a pre-trained deep learning model segmented into a central network and sub-networks.

FIG. 2 illustrates a diagram of a pre-trained deep learning model 200 segmented into a central network 202 and sub-networks 204(1) to 204(8), each illustrating a different function requiring computation by the learning model 200; each of the different functions may involve an underlying computation task, any of which may be heterogeneous from any other. For example, sub-network 204(1) may perform computation for an image captioning function, which may require, by way of example and without limitation thereto, a computation task of translating an image to constituent objects and context therein describable by language. Sub-network 204(2) may perform computation for an image search function, which may require, by way of example and without limitation thereto, a computation task of translating language to objects and context which is matched to existing or generated images. Sub-network 204(3) may perform computation for a video annotation function, which may require, by way of example and without limitation thereto, a computation task of tracking constituent objects and context in videos and generating real-time text descriptions thereof. Sub-network 204(4) may perform computation for a text-to-speech function. Sub-network 204(5) may perform computation for a facial recognition function, which may require, by way of example and without limitation thereto, computation tasks of feature extraction and classification from images. Sub-network 204(6) may perform computation for a reverse image search function, which may require, by way of example and without limitation thereto, compressing, encoding, performing Fourier transform upon and/or hashing an input image and comparing to another image. Sub-network 204(7) may perform computation for a video search function, which may require, by way of example and without limitation thereto, a computation task of translating language to objects and context which is matched to existing or generated videos. Sub-network 204(8) may perform computation for a speech recognition function, which may require, by way of example and without limitation thereto, a computation task of feature extraction, classification, and the like.

Figure 3:
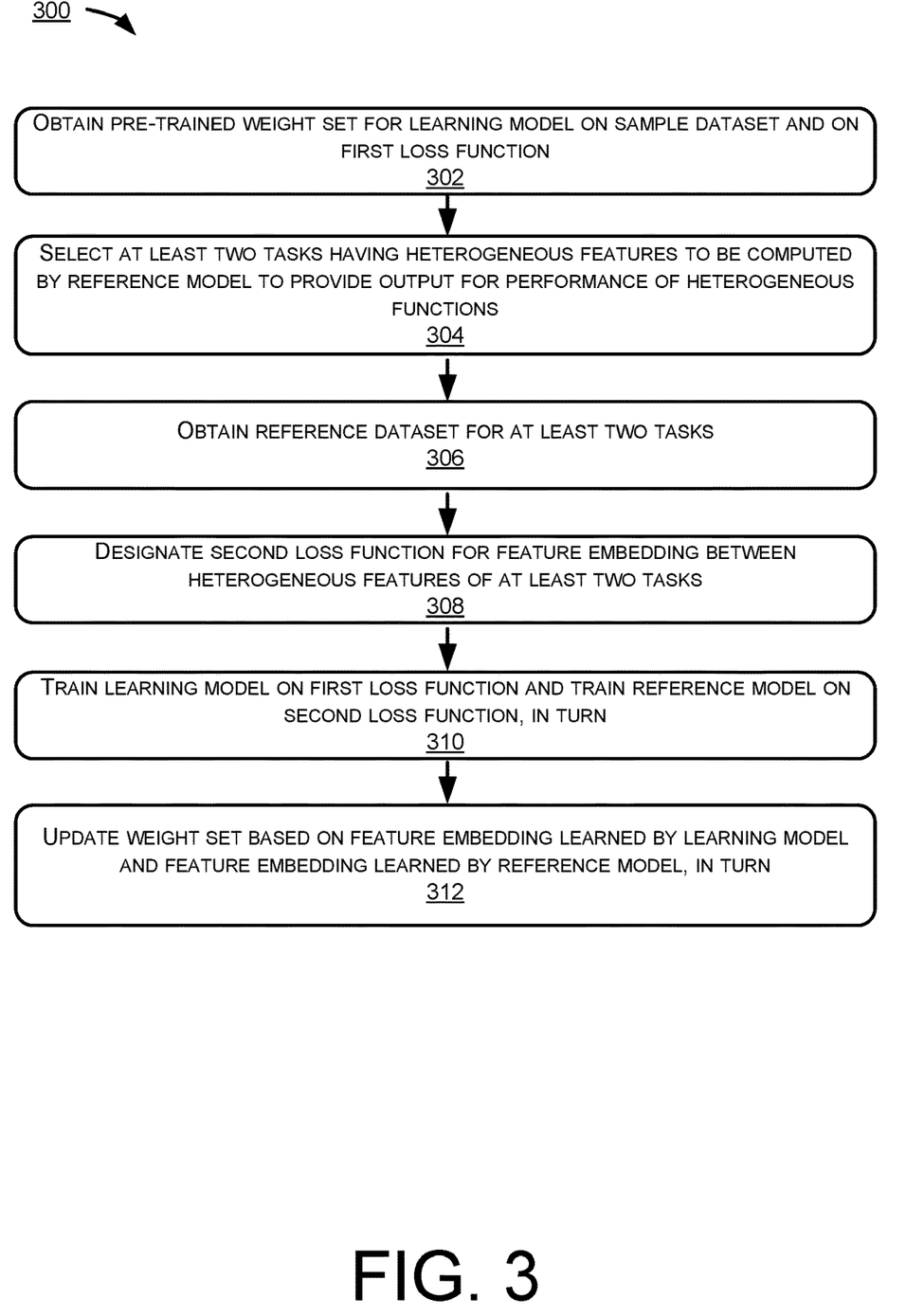
FIG. 3 illustrates a flowchart of a training method according to example embodiments of the present disclosure.

FIG. 3 illustrates a flowchart of a training method 300 according to example embodiments of the present disclosure.

In step 302 of the training method 300, a pre-trained weight set for a learning model on a sample dataset and on a first loss function is obtained.

The learning model may be stored on storage of any learning system as described above, including a cloud computing system and a low-powered computing system, as well as any other computing system having one or more physical or virtual processor(s) capable of executing the learning model to compute tasks for particular functions.

Sample data may generally be any labeled dataset indicating whether data points therein are positive or negative for a particular result. For example, the dataset may be labeled to indicate that a particular data point is positive or negative for a particular result. Alternatively, the dataset may be labeled to indicate classes, clusters, fittings, or other characteristics of data points, such that the labels may indicate that a particular data point does or does not belong to a particular class, cluster, fitting, and the like.

A loss function, or more generally an objective function, is generally any mathematical function having an output which may be optimized during the training of a learning model.

Training of the learning model may, in part, be performed to train the learning model on at least the first loss function to learn a feature embedding operative to compute a task for a particular function. The first loss function may be any conventional objective function operative for the learning model to be trained on for this purpose. For example, the first loss function may be a classification loss function utilized in training a learning model to perform classification tasks for the function of object recognition.

At step 304 of the training method 300, at least two tasks having heterogeneous features to be computed by a reference model to provide output for the performance of heterogeneous functions are selected.

The reference model may be a learning model stored on storage of a same learning system as the learning model, the learning system being any as described above, including a cloud computing system and a low-powered computing system, as well as any other computing system having one or more physical or virtual processor(s) capable of executing the reference model to compute the tasks selected in step 304. For example, for tasks relating to text input, the reference model may be a Long Short-Term Memory (LSTM) network, Bidirectional Encoder Representations from Transformers (BERT), a CNN for natural language processing (NLP), and the like; for tasks relating to image input, the reference model may be a CNN for image processing; and so on.

Examples of heterogeneous functions and tasks which support these heterogeneous functions are given above. The selection of two tasks based on at least some commonality in features between the tasks may be determined based upon commonalities in input between tasks. For example, image input and video input may share commonalities in containing still images (i.e., frames of video input) as data points and thus sharing features extractable from still images. Video input and audio input may share commonalities in containing audio sequences and thus sharing features extractable from audio sequences. However, nevertheless, the two tasks will have at least some heterogeneous features; moreover, the selection of two tasks may not be based upon commonalities in features between the tasks. For example, users may want to experimentally determine whether tasks having entirely heterogeneous features may still have those features embedded in a manner as described below.

While examples of the present disclosure refer to one reference model for illustration, step 304 may include, for each of multiple reference models, selecting at least two tasks having heterogeneous features to be computed by the respective reference model. Tasks selected for each of multiple reference models may be the same tasks, partially the same tasks, or different tasks.

At step 306 of the training method 300, a reference dataset is obtained for the at least two tasks.

Reference data may generally be any labeled dataset indicating whether data points therein are positive or negative for a particular result. For example, the dataset may be labeled to indicate that a particular data point is positive or negative for a particular result. Alternatively, the dataset may be labeled to indicate classes, clusters, fittings, or other characteristics of data points, such that the labels may indicate that a particular data point does or does not belong to a particular class, cluster, fitting, and the like.

Step 306 may further include, for each of multiple reference models, obtaining a reference dataset for the at least two tasks selected for the respective reference model.

At step 308 of the training method 300, a second loss function is designated for feature embedding between the heterogeneous features of the at least two tasks.

Feature embedding generally refers to translating a data set into a dimensional space of reduced dimensionality so as to increase, or maximize, distances between data points (such as individual images) which need to be distinguished in computing a task for a particular function, and decrease, or minimize, distances between data points which need to be matched, clustered, or otherwise found similar in computing a task for a particular function. For example, functions for expressing distance between two data points may be any function which expresses Euclidean distance, such as L2-norm; Manhattan distance; any function which expresses cosine distance, such as the negative of cosine similarity; or any other suitable distance function as known to persons skilled in the art. According to example embodiments of the present disclosure, a distance function evaluating two data points x and y may be written as D(x, y).

Training of the learning model may, in part, be performed to train the learning model on at least the second loss function to learn a feature embedding of the heterogeneous features of the at least two tasks. The second loss function may be any function having a first distance and a second distance as parameters which may be simultaneously optimized for a minimal value of the first distance and a maximal value of the second distance. For example, the second loss function may be a triplet loss function, which, generally, is a function which takes, as parameters, a target data point x, a positive data point $x^p$ which matches the target data point with regard to a feature thereof, and a negative data point $x^n$ which does not match the target data point with regard to the feature. The triplet loss function may calculate a first distance between the target data point x and the positive data point $x^p$, calculate a second distance between the target data point x and the negative data point $x^n$, and calculate a difference between the first distance and the second distance; the difference between the first distance and the second distance may penalize the learning model. Therefore, training the learning model on the triplet loss function may generate a learned feature embedding which optimizes for minimizing the difference between the first distance and the second distance.

The triplet loss function may be further modified to be a hinge loss function. A hinge loss function, generally, is a loss function which negates outputs below a certain threshold but continues to penalize outputs above a certain threshold. Thus, modifying the triplet loss function to be a hinge loss function may entail adding the difference between the first distance and the second distance to a threshold parameter. Consequently, in the event that the difference between the first distance and the second distance is negative (that is, the positive data point $x^p$ is closer to the target data point x than the negative data point $x^n$ is to the target data point x), the output of the hinge loss function may be negated; in the event that it is positive, the output of the hinge loss function may be magnified. Therefore, training the learning model on the hinge loss function may generate a learned feature embedding which simultaneously optimizes for positive data points being nearer to the target data point and negative data points being further from the target point.

The hinge loss function may further be a max of hinges loss function. The max of hinges loss function may determine, for each positive data point $x_i^p$, a respective distance between the target data point x and the respective positive data point $x_i^p$, and determine, for each negative data point $x_i^n$, a respective distance between the target data point x and the respective negative data point $x_i^n$; determine each difference between a distance between the target data point x and the respective positive data point $x_i^p$ and a distance between the target data point x and the respective negative data point $x_i^n$; add each difference to a threshold parameter to obtain a hinge loss; and output the maximum hinge loss among each of these hinge losses. This output may represent the loss resulting from the hard positive data point furthest from the target data point (where "hard positive" refers to positive data points furthest away from the target data point and therefore the most difficult to match with the target data point in general) and the hard negative data point nearest the target data point (where "hard negative" refers to negative data points nearest to the target data point and therefore the most difficult to distinguish from the target data point in general). Therefore, training the learning model on the max of hinges loss function may generate a learned feature embedding which simultaneously optimizes for hard positive data points being nearer to the target data point and hard negative data points being further from the target point.

A feature embedding f( ) of a hard positive data point $x^p$ of a target data point may be expressed as follows:

$$f(x_i^p) = \text{argmax}_{j \neq i}(D(f(x_i), f(x_j)))$$

A feature embedding f( ) of a hard positive data point $x_i^n$ of a target data point may be expressed as follows:

$$f(x_i^n) = \text{argmin}_{j \neq i}(D(f(x_i), f(x_j)))$$

A max of hinges loss function for target data point batches $X_i^a$, positive data point batches $X_i^p$ and negative data point batches $X_i^n$ may be expressed as follows:

$$\frac{1}{\text{batch\_size}} \sum_i^{\text{batch\_size}} [\alpha + D(f(X_i^a), f(X_i^p)) - D(f(X_i^a), f(X_i^n))]_+$$

Alternately, the hinge loss function may further be a sum of hinges loss function. The sum of hinges loss function may determine, for each positive data point $x_i^p$, a respective distance between the target data point x and the respective positive data point $x_i^p$, and determine, for each negative data point $x_i^n$, a respective distance between the target data point x and the respective negative data point $x_i^n$; determine each difference between a distance between the target data point x and the respective positive data point $x_i^p$ and a distance between the target data point x and the respective negative data point $x_i^n$; add each difference to a threshold parameter to obtain a hinge loss; and output the sum of each of these hinge losses. This output may represent the overall hinge loss resulting positive data points and negative data points cumulatively. Therefore, training the learning model on the max of hinges loss function may generate a learned feature embedding which optimizes for positive data points being nearer as a whole to the target data point and negative data points being further as a whole from the target point.

Step 308 may further include, for each of multiple reference models, designating a respective second loss function for feature embedding between the heterogeneous features of the at least two tasks selected for the respective reference model. Each respective second loss function may be the same or may be different relative to each other.

In step 310 of the training method 300, the learning model is trained on the first loss function and the reference model is trained on the second loss function, in turn.

The learning model and the reference model may be, for example, trained in turn during sequential epochs or sequential periods of multiple consecutive epochs, where an epoch refers to a period during which an entire dataset (in turn, the abovementioned sample dataset and the reference dataset) is computed by the learning model once and the weight set is updated based thereupon. Both the learning model training and the reference model training update the same weight set originally generated by training the learning model.

An epoch is divided into multiple batches; during each batch, a subset of the reference data is computed by the learning model. The reference dataset may be segmented into multiple subsets, each for input during one batch. For loss functions such as triplet loss functions where data points are obtained, to avoid the excess computation overhead of obtaining data points from the entire dataset, data points obtained during a batch may be obtained from the subset for input during that batch.

Step 310 may further include training the learning model on the first loss function and training each of multiple reference models on a respective second loss function, each in turn.

In step 312 of the training method 300, the weight set is updated based on a feature embedding learned by the learning model and a feature embedding learned by the reference model, in turn.

The weight set may be updated according to gradient descent (GD) (that is, updated after computation completes for an epoch), stochastic gradient descent (SGD), mini-batch stochastic gradient descent (MB-SGD) (that is, updated after computation of each batch), backpropagation (BP), or any suitable other manner of updating weight sets as known to persons skilled in the art.

Step 312 may further include updating the weight set based on a feature embedding learned by the learning model and respective feature embeddings learned by multiple reference models, in turn.

Figure 4:
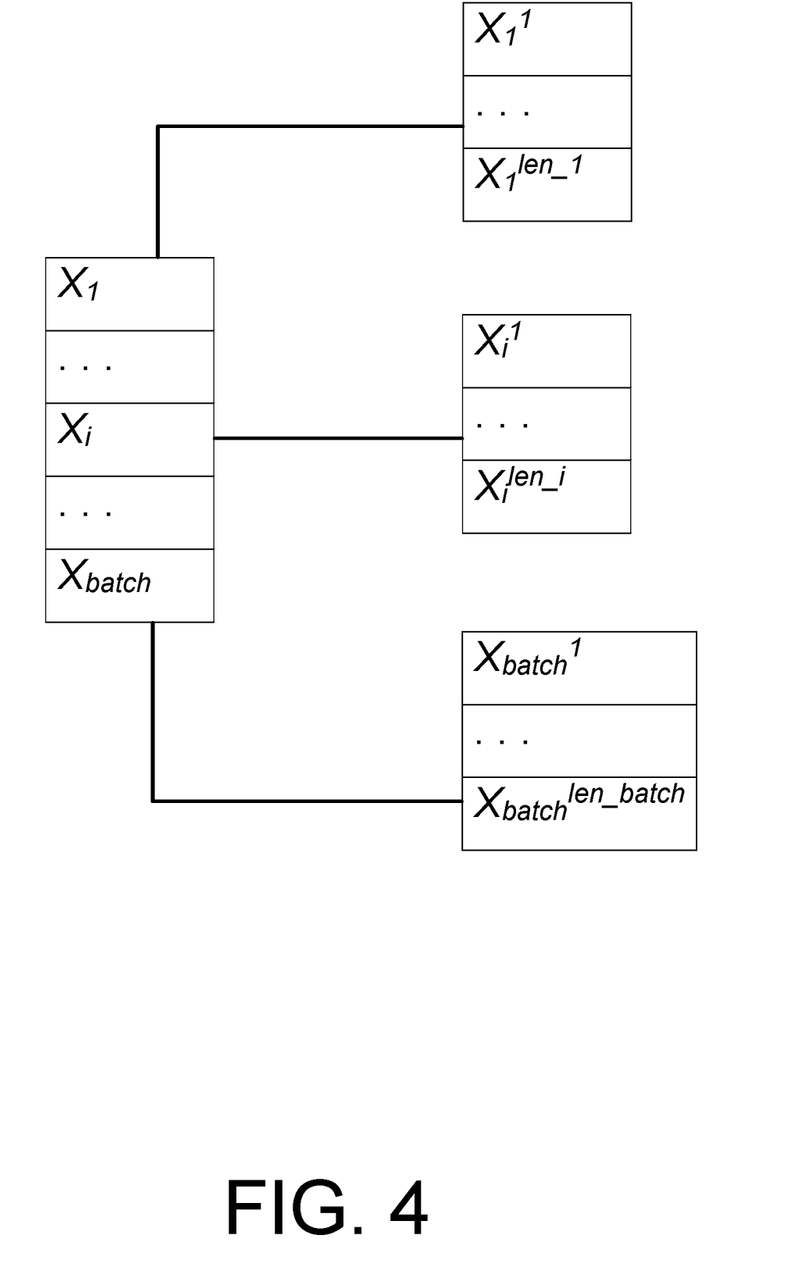
FIG. 4 illustrates obtaining target data points from multiple batches, and obtaining positive and/or negative data points for those batches.

FIG. 4 illustrates obtaining target data points from multiple batches, and obtaining positive and/or negative data points for those batches. For each batch $1, \ldots, i, \ldots,$ batch (where batch expresses the number of batches), a set of target data X is obtained (resulting in sets $X_1, \ldots, X_i, \ldots, X_{batch}$). Each set of target data X may have a corresponding length $len\_1, \ldots, len\_i, \ldots, len\_batch$. Thus, for each set of target data $X_i$, a set of positive or negative data points $X_i^1, \ldots, X_i^{len\_i}$, where len_i is the length of $X_i$ (in the example of FIG. 4, positive data points) is obtained from labeled data points. Each of these sets of positive or negative data points may be obtained randomly from data points which are labeled to positively match or negatively match the target data point with respect to a particular feature.

Figure 5:
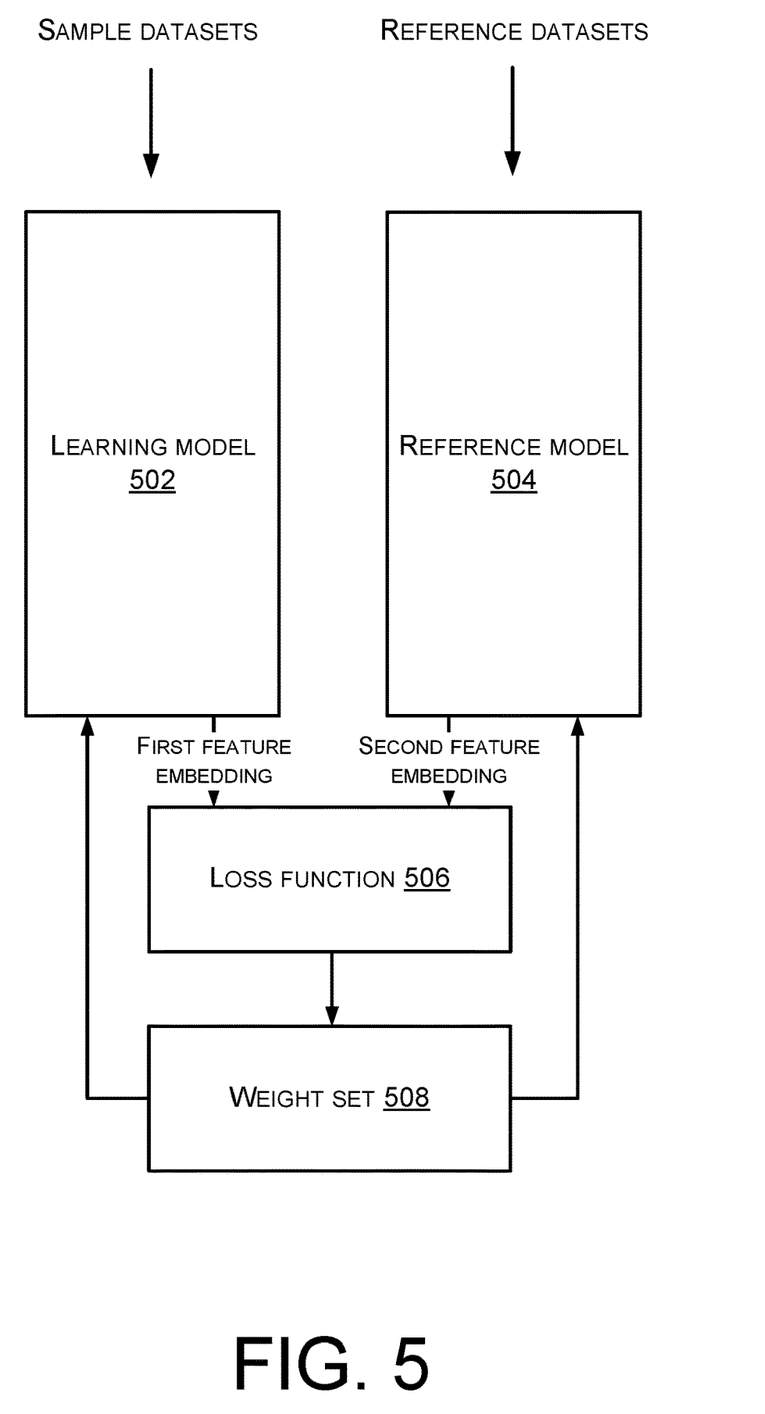
FIG. 5 illustrates a diagram of training learning and reference models and updating a weight set according to example embodiments of the present disclosure.

FIG. 5 illustrates a diagram 500 of performance of steps 310 and 312 according to example embodiments of the present disclosure. In turn, learning model 502 is trained over sample datasets such as image datasets, video datasets, or speech audio datasets for computing a particular task, and reference model 504 is trained over reference datasets for computing the at least two tasks as described above. Learning model 502 learns a first feature embedding which optimizes for a loss function 506, and updates the weight set 508 in accordance with any suitable manner as described above. Reference model 504 learns a second feature embedding which optimizes for a loss function 506, and updates the weight set 508 in accordance with any suitable manner as described above. These steps may occur in turn as described above. According to example embodiments of the present disclosure, multiple reference models may be trained over respective reference data sets for computing a respective at least two tasks, and each such reference model may be trained in turn.

Subsequent to completion of step 312, the weight set may be stored by the learning system. Subsequent computation of the at least two tasks by the learning model may be performed by the learning system loading the weight set into memory and executing the central network of the learning model to compute intermediate data for the tasks received from sub-networks of the learning model, using the weight set. Intermediate data may include, for example, features extracted by each different sub-network from heterogeneous inputs for the different tasks. Since the same weight set may be loaded into memory for computing the features of each task, the learning system may compute the features for each task in parallel without loading any other weight set during the computation, increasing efficiency and reducing computational overhead of the computations. Alternatively, multiple weight sets may be stored by the learning system, each one updated based on a feature embedding learned by the learning model and a feature embedding learned by a different reference model or multiple different reference models, where each reference model computes multiple different tasks having heterogeneous features to support performance of different heterogeneous functions. Thus, a learning system may still load multiple different weight sets to perform computations to support performance of different heterogeneous functions at end devices; however, the number of different weight sets may still be relatively reduced, due to each weight set supporting computation of at least multiple tasks based on a different set of heterogeneous features from each other weight set.

Figure 6:
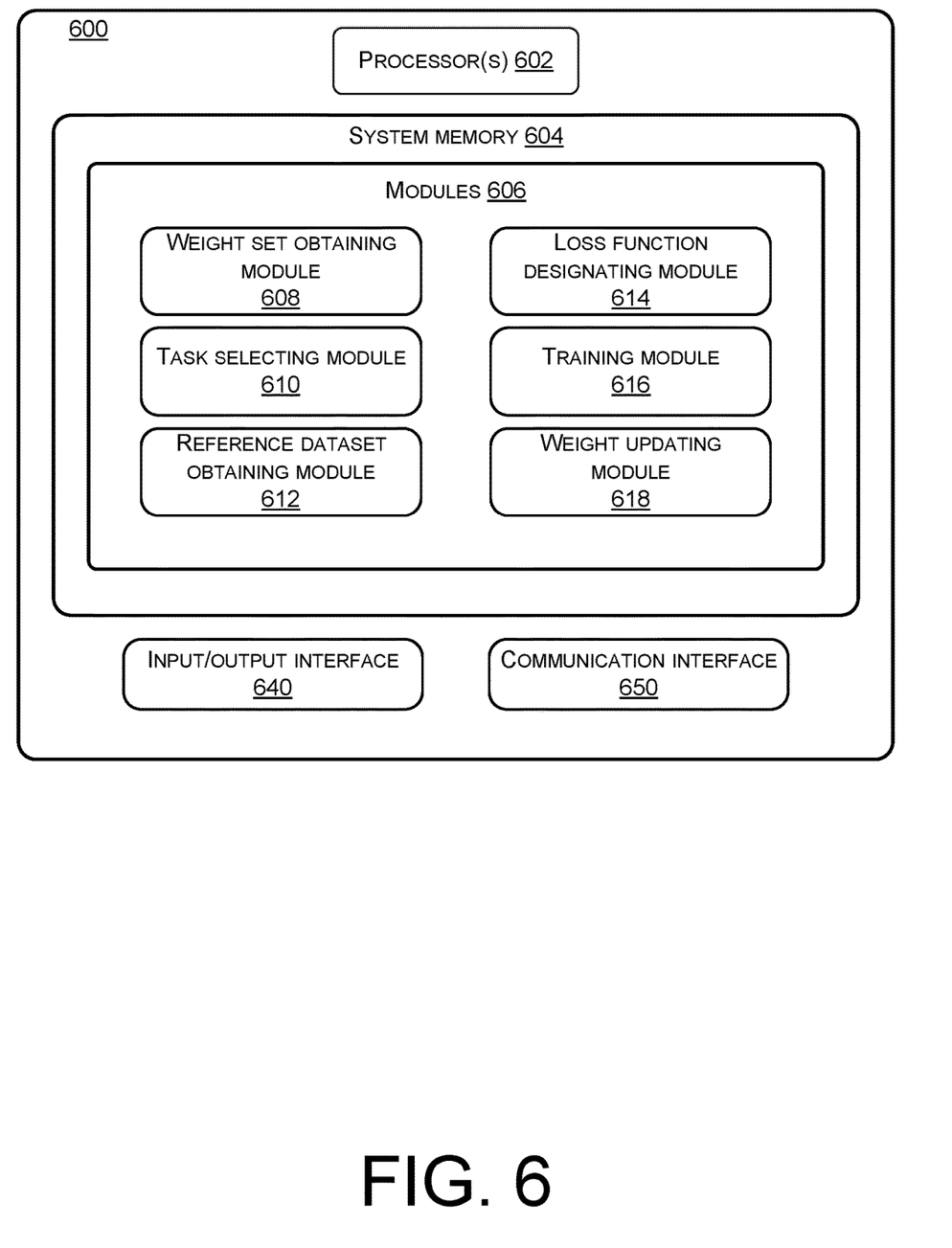
FIG. 6 illustrates an example system for implementing the processes and methods described herein for implementing training of learning models.

FIG. 6 illustrates an example system 600 for implementing the processes and methods described above for implementing training of learning models.

The techniques and mechanisms described herein may be implemented by multiple instances of the system 600, as well as by any other computing device, system, and/or environment. The system 600 may be a distributed system composed of multiple physically networked computers or web servers, a physical or virtual cluster, a computing cloud, or other networked computing architectures providing physical or virtual computing resources as known by persons skilled in the art. Examples thereof include learning systems such as the cloud computing system and the low-powered system as described above with reference to FIG. 1. The system 600 shown in FIG. 6 is only one example of a system and is not intended to suggest any limitation as to the scope of use or functionality of any computing device utilized to perform the processes and/or procedures described above. Other well-known computing devices, systems, environments and/or configurations that may be suitable for use with the embodiments include, but are not limited to, personal computers, server computers, hand-held or laptop devices, multiprocessor systems, microprocessor-based systems, set top boxes, game consoles, programmable consumer electronics, network PCs, minicomputers, mainframe computers, distributed computing environments that include any of the above systems or devices, implementations using field programmable gate arrays ("FPGAs") and application specific integrated circuits ("ASICs"), and/or the like.

The system 600 may include one or more processors 602 and system memory 604 communicatively coupled to the processor(s) 602. The processor(s) 602 and system memory 604 may be physical or may be virtualized and/or distributed. The processor(s) 602 may execute one or more modules and/or processes to cause the processor(s) 602 to perform a variety of functions. In embodiments, the processor(s) 602 may include a central processing unit (CPU), a graphics processing unit (GPU), both CPU and GPU, or other processing units or components known in the art. Additionally, each of the processor(s) 602 may possess its own local memory, which also may store program modules, program data, and/or one or more operating systems.

Depending on the exact configuration and type of the system 600, the system memory 604 may be volatile, such as RAM, non-volatile, such as ROM, flash memory, miniature hard drive, memory card, and the like, or some combination thereof. The system memory 604 may include one or more computer-executable modules 606 that are executable by the processor(s) 602. The modules 606 may be hosted on a network as services for a data processing platform, which may be implemented on a separate system from the system 600.

The modules 606 may include, but are not limited to, a weight set obtaining module 608, a task selecting module 610, a reference dataset obtaining module 612, a loss function designating module 614, a training module 616, and a weight updating module 618.

The weight set obtaining module 608 may be configured to obtain a pre-trained weight set for a learning model on a sample dataset and on a first loss function as abovementioned with reference to FIG. 3.

The task selecting module 610 may be configured to select at least two tasks having heterogeneous features to be computed by a reference model to provide output for the performance of heterogeneous functions as abovementioned with reference to FIG. 3.

The reference dataset obtaining module 612 may be configured to obtain a reference dataset for the at least two tasks as abovementioned with reference to FIG. 3.

The loss function designating module 614 may be configured to designate a second loss function for feature embedding between the heterogeneous features of the at least two tasks as abovementioned with reference to FIG. 3.

The training module 616 may be configured to train the learning model on the first loss function and train the reference model on the second loss function, in turn, as abovementioned with reference to FIG. 3.

The weight updating module 618 may be configured to update the weight set based on a feature embedding learned by the learning model and a feature embedding learned by the reference model, in turn, as abovementioned with reference to FIG. 3.

The system 600 may additionally include an input/output (I/O) interface 640 and a communication module 650 allowing the system 600 to communicate with other systems and devices over a network, such as the data processing platform, a computing device of a data owner, and a computing device of a data collector. The network may include the Internet, wired media such as a wired network or direct-wired connections, and wireless media such as acoustic, radio frequency (RF), infrared, and other wireless media.

Some or all operations of the methods described above can be performed by execution of computer-readable instructions stored on a computer-readable storage medium, as defined below. The term "computer-readable instructions" as used in the description and claims, include routines, applications, application modules, program modules, programs, components, data structures, algorithms, and the like. Computer-readable instructions can be implemented on various system configurations, including single-processor or multiprocessor systems, minicomputers, mainframe computers, personal computers, hand-held computing devices, microprocessor-based, programmable consumer electronics, combinations thereof, and the like.

The computer-readable storage media may include volatile memory (such as random-access memory (RAM)) and/or non-volatile memory (such as read-only memory (ROM), flash memory, etc.). The computer-readable storage media may also include additional removable storage and/or non-removable storage including, but not limited to, flash memory, magnetic storage, optical storage, and/or tape storage that may provide non-volatile storage of computer-readable instructions, data structures, program modules, and the like.

A non-transient computer-readable storage medium is an example of computer-readable media. Computer-readable media includes at least two types of computer-readable media, namely computer-readable storage media and communications media. Computer-readable storage media includes volatile and non-volatile, removable and non-removable media implemented in any process or technology for storage of information such as computer-readable instructions, data structures, program modules, or other data. Computer-readable storage media includes, but is not limited to, phase change memory (PRAM), static random-access memory (SRAM), dynamic random-access memory (DRAM), other types of random-access memory (RAM), read-only memory (ROM), electrically erasable programmable read-only memory (EEPROM), flash memory or other memory technology, compact disk read-only memory (CD-ROM), digital versatile disks (DVD) or other optical storage, magnetic cassettes, magnetic tape, magnetic disk storage or other magnetic storage devices, or any other non-transmission medium that can be used to store information for access by a computing device. In contrast, communication media may embody computer-readable instructions, data structures, program modules, or other data in a modulated data signal, such as a carrier wave, or other transmission mechanism. As defined herein, computer-readable storage media do not include communication media.

The computer-readable instructions stored on one or more non-transitory computer-readable storage media that, when executed by one or more processors, may perform operations described above with reference to FIGS. 1-5. Generally, computer-readable instructions include routines, programs, objects, components, data structures, and the like that perform particular functions or implement particular abstract data types. The order in which the operations are described is not intended to be construed as a limitation, and any number of the described operations can be combined in any order and/or in parallel to implement the processes.

By the abovementioned technical solutions, the present disclosure provides a training method for learning models, updating a weight set in turn on feature embeddings trained from at least two different learning models. The weight set is updated in part on a loss function which optimizes for minimizing distance of sample data points from hard positive reference data points, and maximizing distance of sample data points from hard negative reference data points. Since data points are taken from heterogeneous data for computation of tasks supporting performance of heterogeneous functions, the loss function optimizes for feature embeddings which emphasize similarities between features of these heterogeneous data, and repeated training and updating of weights results in a weight set that enables a learning model to compute heterogeneous data in parallel to compute tasks supporting heterogeneous functions. Consequently, this computation may be executed centrally on a learning system, such as a cloud computing system or a low-powered system, alleviating computational overhead in executing the learning model and loading different weight sets at a central network, after similar features are extracted from input data collected by end devices and computed by sub-networks.

EXAMPLE CLAUSES

A. A method comprising: obtaining a pre-trained weight set for a learning model on a sample dataset and on a first loss function; selecting at least two tasks having heterogeneous features to be computed by a reference model; obtaining a reference dataset for the at least two tasks; designating a second loss function for feature embedding between the heterogeneous features of the at least two tasks; training the learning model on the first loss function and training the reference model on the second loss function, in turn; and updating the weight set based on a feature embedding learned by the learning model and a feature embedding learned by the reference model, in turn.

B. The method as paragraph A recites, wherein the second loss function has a first distance and a second distance as parameters and training of the reference model on the second loss function is optimized for a minimal value of the first distance and a maximal value of the second distance.

C. The method as paragraph B recites, wherein the second loss function is a triplet loss function.

D. The method as paragraph C recites, wherein the second loss function is a hinge loss function.

E. The method as paragraph D recites, wherein the second loss function is a max of hinges loss function.

F. The method as paragraph D recites, wherein the second loss function is a sum of hinges loss function.

G. The method as paragraph A recites, wherein the reference dataset is segmented into a plurality of batches, and the weight set is updated after computation of each batch of the plurality of batches.

H. A system comprising: one or more processors; and memory communicatively coupled to the one or more processors, the memory storing computer-executable modules executable by the one or more processors that, when executed by the one or more processors, perform associated operations, the computer-executable modules comprising: a weight set obtaining module configured to obtain a pre-trained weight set for a learning model on a sample dataset and on a first loss function; a task selecting module configured to select at least two tasks having heterogeneous features to be computed by a reference model to provide output for the performance of heterogeneous functions; a reference dataset obtaining module configured to obtain a reference dataset for the at least two tasks; a loss function designating module configured to designate a second loss function for feature embedding between the heterogeneous features of the at least two tasks; a training module configured to train the learning model on the first loss function and train the reference model on the second loss function, in turn; and a weight updating module configured to update the weight set based on a feature embedding learned by the learning model and a feature embedding learned by the reference model, in turn.

I. The system as paragraph H recites, wherein the loss function designating module is configured to designate a second loss function having a first distance and a second distance as parameters, and the training module is configured to train the reference model on the second loss function optimized for a minimal value of the first distance and a maximal value of the second distance.

J. The system as paragraph I recites, wherein the loss function designating module is configured to designate a triplet loss function as the second loss function.

K. The system as paragraph J recites, wherein the loss function designating module is configured to designate a hinge loss function as the second loss function.

L. The system as paragraph K recites, wherein the loss function designating module is configured to designate a max of hinges loss function as the second loss function.

M. The system as paragraph K recites, wherein the loss function designating module is configured to designate a sum of hinges loss function as the second loss function.

N. The system as paragraph H recites, wherein the reference dataset is segmented into a plurality of batches, and the weight set updating module is configured to update the weight set after computation of each batch of the plurality of batches.

O. A computer-readable storage medium storing computer-readable instructions executable by one or more processors, that when executed by the one or more processors, cause the one or more processors to perform operations comprising: obtaining a pre-trained weight set for a learning model on a sample dataset and on a first loss function; selecting at least two tasks having heterogeneous features to be computed by a reference model; obtaining a reference dataset for the at least two tasks; designating a second loss function for feature embedding between the heterogeneous features of the at least two tasks; training the learning model on the first loss function and training the reference model on the second loss function, in turn; and updating the weight set based on a feature embedding learned by the learning model and a feature embedding learned by the reference model, in turn.

P. The computer-readable storage medium as paragraph O recites, wherein the second loss function has a first distance and a second distance as parameters and training of the reference model on the second loss function is optimized for a minimal value of the first distance and a maximal value of the second distance.

Q. The computer-readable storage medium as paragraph P recites, wherein the second loss function is a triplet loss function.

R. The computer-readable storage medium as paragraph Q recites, wherein the second loss function is a hinge loss function.

S. The computer-readable storage medium as paragraph R recites, wherein the second loss function is a max of hinges loss function.

T. The computer-readable storage medium as paragraph R recites, wherein the second loss function is a sum of hinges loss function.

U. The computer-readable storage medium as paragraph O recites, wherein the reference dataset is segmented into a plurality of batches, and the weight set is updated after computation of each batch of the plurality of batches.

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:

1. A method comprising:
    obtaining, by one or more processor(s) of a system, a pre-trained weight set for a learning model on a sample dataset and on a first loss function;
    selecting, by the one or more processor(s), at least two tasks, wherein respective inputs of the at least two tasks to be computed by a reference model have heterogeneous features, wherein a heterogeneous feature of an input of a first task of the at least two tasks is not extractable from an input of a second task of the at least two tasks, and a heterogeneous feature of the input of the second task is not extractable from the input of the first task;
    obtaining, by the one or more processor(s), a reference dataset for the at least two tasks;
    designating, by the one or more processor(s), a second loss function for feature embedding between the heterogeneous features of the inputs of the at least two tasks;
    training, by the one or more processor(s), the learning model on the first loss function and training the reference model on the second loss function, in turn, during respective sequential epochs or during respective sequential periods of consecutive epochs, wherein values of the same pre-trained weight set are updated during each epoch; and
    updating, by the one or more processor(s), the values of the weight set based on a feature embedding learned by the learning model and a feature embedding learned by the reference model, in turn.

2. The method of claim 1, wherein the second loss function has a first distance and a second distance as parameters and training of the reference model on the second loss function is optimized for a minimal value of the first distance and a maximal value of the second distance.

3. The method of claim 2, wherein the second loss function is a triplet loss function.

4. The method of claim 3, wherein the second loss function is a hinge loss function.

5. The method of claim 1, wherein an input of a first task among the at least two tasks has features comprising at least one of image features, facial image features, video features, audio features, and text features.

6. The method of claim 5, wherein an input of a second task among the at least two tasks has features not comprising at least one of the features of the first task.

7. The method of claim 1, wherein the reference dataset is segmented into a plurality of batches, and the weight set is updated after computation of each batch of the plurality of batches.

8. A system comprising:
    one or more processors; and
    memory communicatively coupled to the one or more processors, the memory storing computer-executable modules executable by the one or more processors that, when executed by the one or more processors, perform associated operations, the computer-executable modules comprising:
        a weight set obtaining module configured to obtain a pre-trained weight set for a learning model on a sample dataset and on a first loss function;
        a task selecting module configured to select at least two tasks, wherein respective inputs of the at least two tasks to be computed by a reference model to provide output for the performance of heterogeneous functions have heterogeneous features, wherein a heterogeneous feature of an input of a first task of the at least two tasks is not extractable from an input of a second task of the at least two tasks, and a heterogeneous feature of the input of the second task is not extractable from the input of the first task;
        a reference dataset obtaining module configured to obtain a reference dataset for the at least two tasks;
        a loss function designating module configured to designate a second loss function for feature embedding between the heterogeneous features of the inputs of the at least two tasks;
        a training module configured to train the learning model on the first loss function and train the reference model on the second loss function, in turn, during respective sequential epochs or during respective sequential periods of consecutive epochs, wherein values of the same pre-trained weight set are updated during each epoch; and
        a weight updating module configured to update the values of the weight set based on a feature embedding learned by the learning model and a feature embedding learned by the reference model, in turn.

9. The system of claim 8, wherein the loss function designating module is configured to designate a second loss function having a first distance and a second distance as parameters, and
    the training module is configured to train the reference model on the second loss function optimized for a minimal value of the first distance and a maximal value of the second distance.

10. The system of claim 9, wherein the loss function designating module is configured to designate a triplet loss function as the second loss function.

11. The system of claim 10, wherein the loss function designating module is configured to designate a hinge loss function as the second loss function.

12. The system of claim 8, wherein the one or more processors comprise one or more special-purpose processors implementing an engine operative to compute at least one of matrix operations and vector operations.

13. The system of claim 12, further comprising a data center hosting the one or more special-purpose processors.

14. The system of claim 13, further comprising one or more cloud networks hosting one or more network-accessed interfaces operative to execute the computer-executable modules on the special-purpose processors.

15. A computer-readable storage medium storing computer-readable instructions executable by one or more processors, that when executed by the one or more processors, cause the one or more processors to perform operations comprising:

obtaining a pre-trained weight set for a learning model on a sample dataset and on a first loss function;

selecting at least two tasks, wherein respective inputs of the at least two tasks to be computed by a reference model have heterogeneous features, wherein a heterogeneous feature of an input of a first task of the at least two tasks is not extractable from an input of a second task of the at least two tasks, and a heterogeneous feature of the input of the second task is not extractable from the input of the first task;

obtaining a reference dataset for the at least two tasks;

designating a second loss function for feature embedding between the heterogeneous features of the inputs of the at least two tasks;

training the learning model on the first loss function and training the reference model on the second loss function, in turn, during respective sequential epochs or during respective sequential periods of consecutive epochs, wherein values of the same pre-trained weight set are updated during each epoch; and updating the values of the weight set based on a feature embedding learned by the learning model and a feature embedding learned by the reference model, in turn.

16. The computer-readable storage medium of claim 15, wherein the second loss function has a first distance and a second distance as parameters and training of the reference model on the second loss function is optimized for a minimal value of the first distance and a maximal value of the second distance.

17. The computer-readable storage medium of claim 16, wherein the second loss function is a triplet loss function.

18. The computer-readable storage medium of claim 17, wherein the second loss function is a hinge loss function.

19. The computer-readable storage medium of claim 18, wherein the second loss function is a max of hinges loss function.

20. The computer-readable storage medium of claim 15, wherein the reference dataset is segmented into a plurality of batches, and the weight set is updated after computation of each batch of the plurality of batches.

* * * * *